United States Patent
Lovatt

(10) Patent No.: US 6,568,519 B2
(45) Date of Patent: May 27, 2003

(54) TORQUE LIMITING CHAIN SPROCKET ASSEMBLY

(75) Inventor: Brian Andrew Lovatt, Novi, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 09/928,278

(22) Filed: Aug. 10, 2001

(65) Prior Publication Data

US 2003/0029688 A1 Feb. 13, 2003

(51) Int. Cl.[7] .............................................. F16D 23/00
(52) U.S. Cl. ..................... 192/56.6; 192/70.2; 192/89.2; 180/233
(58) Field of Search ............................... 192/56.6, 56.1, 192/89.2, 70.2; 180/233

(56) References Cited

U.S. PATENT DOCUMENTS

| | | |
|---|---|---|
| 4,132,297 A | 1/1979 | Brown et al. |
| 4,762,021 A | 8/1988 | Teraoka |
| 5,281,190 A | 1/1994 | Koivunen |
| 5,407,024 A | 4/1995 | Watson et al. |
| 5,485,894 A | 1/1996 | Watson et al. |
| 5,966,999 A | 10/1999 | Showalter et al. |
| 5,992,243 A * | 11/1999 | Leeper ........................ 180/247 |
| 6,033,334 A * | 3/2000 | Showalter ................... 180/249 |
| 6,062,361 A * | 5/2000 | Showalter ..................... 192/35 |
| 6,079,535 A | 6/2000 | Mueller et al. |
| 6,155,395 A * | 12/2000 | Braford, Jr. ................. 180/247 |
| 6,299,565 B1 * | 10/2001 | Jain et al. .................... 475/128 |

* cited by examiner

Primary Examiner—Saul Rodriguez
(74) Attorney, Agent, or Firm—Brinks Hofer Gilson and Lione

(57) ABSTRACT

A chain sprocket assembly for use in a motor vehicle transfer case includes a torque limiting clutch which limits the torque provided to a secondary drive line. The chain sprocket assembly includes a chain receiving collar having an inwardly extending annular member which is received between two friction clutch packs. The friction clutch packs are operably disposed between the chain receiving collar and a circular housing which is splined to a secondary output shaft of the transfer case. A spring biasing mechanism which engages outer faces of the clutch packs and compresses them against the annular member of the chain receiving collar may be adjusted to provide a desired compressive force to achieve a desired maximum torque throughput from the chain to the secondary output shaft.

20 Claims, 4 Drawing Sheets

TORQUE LIMITING CHAIN SPROCKET ASSEMBLY

BACKGROUND OF THE INVENTION

The invention relates generally to a torque limiting sprocket assembly and more particularly to a chain sprocket assembly having an integral torque limiting clutch. The assembly may be advantageously, though not exclusively, used in motor vehicle transfer cases and other vehicle power train components.

The delivery of power and specifically drive torque in a four-wheel drive motor vehicle from a primary drive line which is continuously active to a secondary drive line which may deliver torque to a secondary set of drive wheels on a part time basis is the subject of much study and innumerable mechanical configurations and operating routines. Generally speaking, a clutch operably resides between the primary and secondary drive lines in a transfer case and delivers torque from the primary drive line to the secondary drive line. The clutch may take many forms: a straightforward mechanical device such as a dog clutch having only fully engaged and fully released operating states, an overrunning clutch which engages only when a speed difference exists between the drive lines, a viscous clutch which is always operational and provides increasing resistance with increasing speed difference between the primary and secondary drive lines and an electrically or hydraulically modulatable friction clutch which may be controlled according to diverse programs and operating sequences to apportion torque delivery to the primary and secondary drive lines from 100% to the primary drive line (0% to the secondary drive line) to a 50%—50% torque split between the drive lines and typically at many or an infinite number of levels therebetween.

Particularly in the two stage (on-off) systems but in the overrunning, viscous and modulatable systems as well, it may be beneficial to limit the maximum torque delivered to the secondary drive line wheels. For example, a particular vehicle weight, weight distribution or intended service environment may dictate limiting the torque delivered to the secondary (typically front) axle and wheels of a four wheel drive vehicle in order to provide optimum performance. Similarly, it may be desirable from an overall vehicle operation standpoint to limit the maximum torque delivered to the secondary axle and wheels.

The present invention relates to a torque limiting assembly which may be disposed integrally with one the chain sprockets in the chain drive assembly of a typical transfer case.

BRIEF SUMMARY OF THE INVENTION

A chain sprocket assembly for use in a motor vehicle transfer case includes a torque limiting clutch which limits the torque provided to a secondary drive line. The chain sprocket assembly includes a chain receiving collar having an inwardly extending annular member which is received between two friction clutch packs. The friction clutch packs are operably disposed between the chain receiving collar and a circular housing which is splined to a secondary output shaft of the transfer case. A spring biasing mechanism which engages outer faces of the clutch packs and compresses them against the annular member of the chain receiving collar may be adjusted to provide a desired compressive force to achieve a desired maximum torque throughput from the chain to the secondary output shaft. In operation, the chain sprocket assembly will transmit torque to the secondary output shaft and the secondary drive line up to the preset maximum and which threshold the friction clutch packs will slip, thus limiting torque throughput to the preselected level.

Thus, it is an object of the present invention to provide a chain sprocket having an integral torque limiting clutch.

It is a further object of the present invention to provide a chain sprocket having an integral torque limiting clutch which may be disposed in a transfer case or other motor vehicle power train component.

It is a still further object of the present invention to provide a torque limiting clutch assembly which may be disposed within a chain sprocket in the chain drive assembly of a motor vehicle transfer case or similar vehicle power train component.

Further objects and advantages of the present invention will become apparent by reference to the following description of the preferred and alternate embodiments and appended drawings wherein like reference numbers refer to the same component, element or feature.

DETAILED DESCRIPTION OF THE PREFERRED AND ALTERNATE EMBODIMENTS

Figure 1:
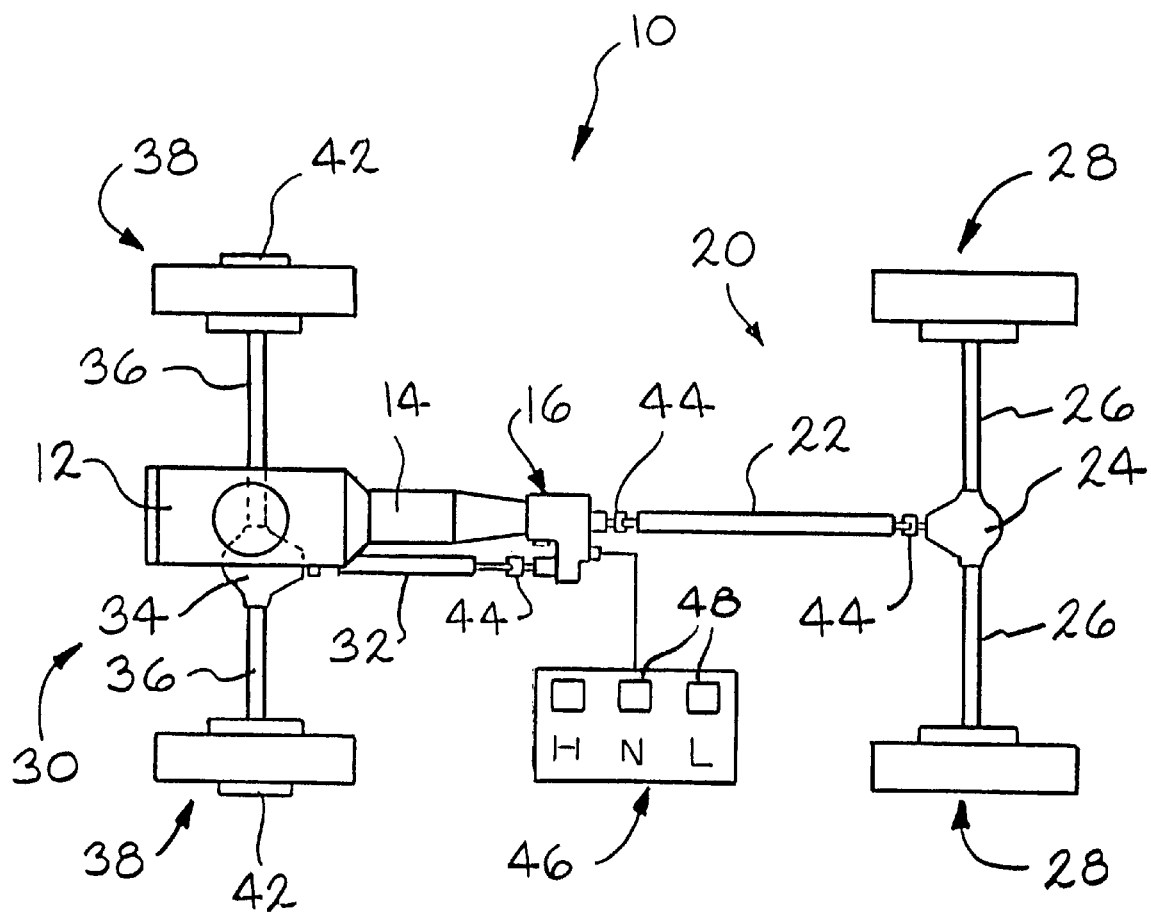
FIG. 1 is a diagrammatic, plan view of a four-wheel drive motor vehicle having a transfer case incorporating a chain sprocket assembly according to the present invention.

Referring now to FIG. 1, a four-wheel vehicle drive train is diagrammatically illustrated and designated by the reference number 10. The four-wheel vehicle drive train 10 includes a prime mover 12 which is coupled to and directly drives a transmission 14. The transmission 14 may either be an automatic or manual type. The output of the transmission 14 directly drives a transfer case assembly 16 which provides motive power to a primary or rear drive line 20 comprising a primary or rear prop shaft 22, a primary or rear differential 24, a pair of live primary or rear axles 26 and a respective pair of primary or rear tire and wheel assemblies 28.

The transfer case assembly 16 also selectively provides motive power to a secondary or front drive line 30 comprising a secondary or front prop shaft 32, a secondary or front differential assembly 34, a pair of live secondary or front axles 36 and a respective pair of secondary or front tire and wheel assemblies 38. The front tire and wheel assemblies 38 may be directly coupled to a respective one of the pair of front axles 36 or, if desired, a pair of manually or remotely activateable locking hubs 42 may be operably disposed between the pair of front axles 36 and a respective one of the tire and wheel assemblies 38 to selectively connect same. Finally, both the primary drive line 20 and the secondary drive line 30 may include suitable and appropriately disposed universal joints 44 which function in conventional fashion to allow static and dynamic offsets and misalignments between the various shafts and components.

A control console 46 which is preferably disposed within convenient reach of the vehicle operator includes a switch or a plurality of individual switches or push buttons 48 which facilitate selection of the operating mode of the transfer case assembly 16 as will be further described below.

The foregoing and following description relates to a vehicle wherein the rear drive line 20 functions as the primary drive line, i.e., it is engaged and operates substantially all the time and, correspondingly, the front drive line 30 functions as the secondary drive line, i.e., it is engaged and operates only part-time or in a secondary or supplemental fashion.

These designations "primary" and "secondary" are utilized herein rather than "front" and "rear" inasmuch as the invention herein disclosed and claimed may be readily utilized in transfer cases wherein the primary drive line 20 is disposed at the front of the vehicle and the secondary drive line 30 is disposed at the rear of the vehicle. Such designations "primary" and "secondary" thus broadly and properly characterize the function of the individual drive lines rather than their specific locations.

Figure 2:
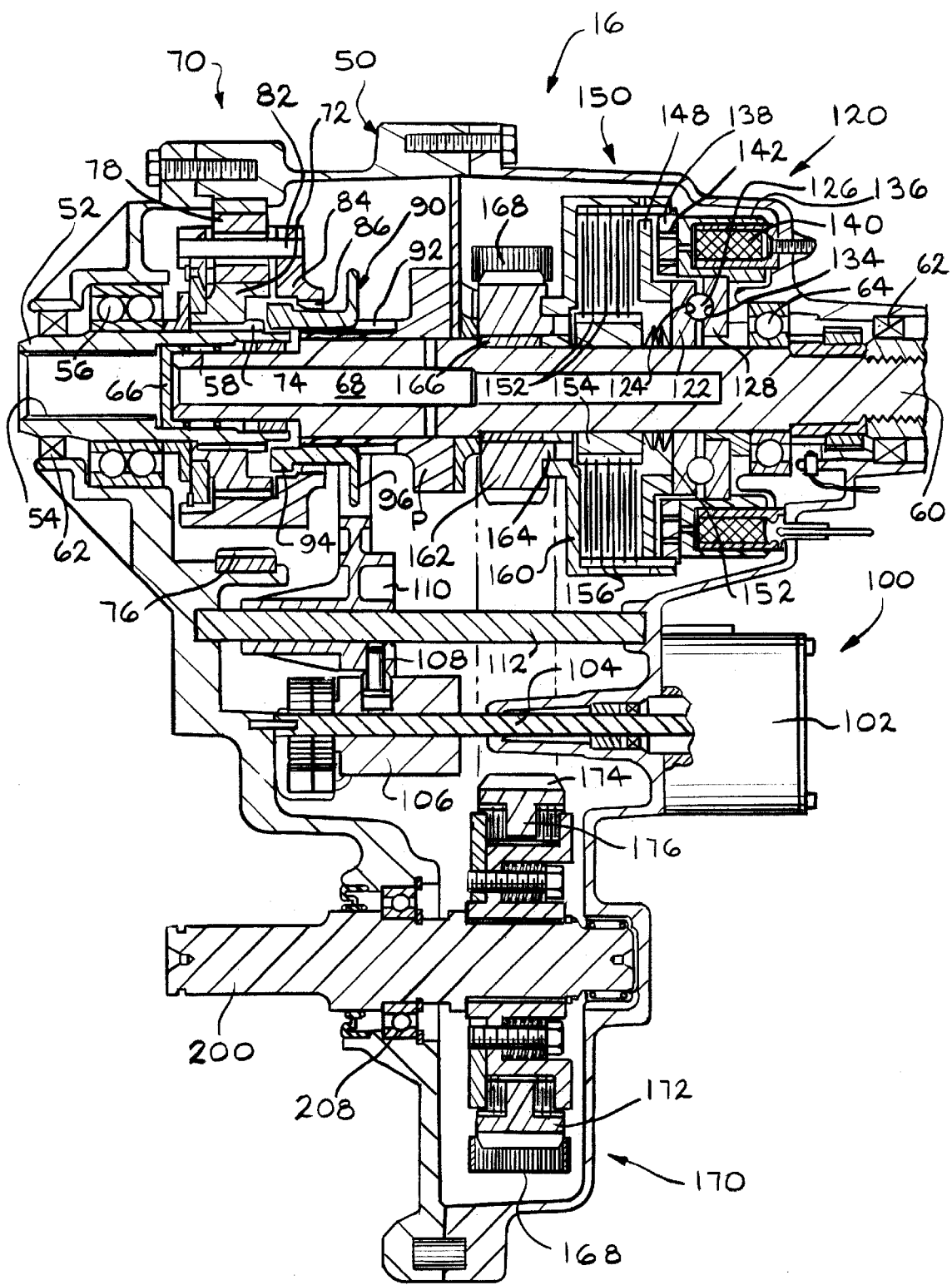
FIG. 2 is full, sectional view of a transfer case incorporating a chain sprocket assembly according to the present invention.

Referring now to FIGS. 1 and 2, the transfer case assembly 16 incorporating the present invention includes a multiple piece, typically cast, housing assembly 50 having planar and circular sealing surfaces, openings for shafts and bearings and various recesses, shoulders, flanges, counterbores and the like to receive various components and assemblies of the transfer case assembly 16. An input shaft 52 includes female or internal splines or gear teeth 54 or other suitable structure which drivingly couple an output of the transmission 14 illustrated in FIG. 1 to the input shaft 52. The input shaft 52 is rotatably supported by anti-friction bearings such as the bearing assemblies 56 and internally by an anti-friction bearing such as the roller bearing assembly 58. The roller bearing assembly 58 is disposed upon a reduced diameter portion of an output shaft 60. Suitable oil seals 62, positioned between the shafts 52 and 60 and the housing assembly 50, provide an appropriate fluid tight seal therebetween. The opposite end of the output shaft 60 is supported by an anti-friction bearing such as a ball bearing assembly 64. An end cap or seal 66 closes off the end of an axial passageway 68 in the output shaft 60. A gerotor pump P will typically be utilized to provide a flow of lubricating and cooling fluid to the axial passageway 68 which is thence distributed through a plurality of radial ports in the output shaft 60 to the components of the transfer case assembly 16.

The transfer case assembly 16 also includes a two-speed planetary (epicyclic) gear speed reduction assembly 70 disposed generally about the input shaft 52. The planetary gear assembly 70 includes a sun gear 72 having internal splines or gear teeth which are engaged by complementary external splines or gear teeth 74 formed on the input shaft 52. Radially aligned with the sun gear 72 is a ring gear 76. The ring gear 76 is fixedly retained within the housing assembly 50 by any suitable retaining structure such as a snap ring (not illustrated). A plurality of pinion gears 78 are rotatably received upon a like plurality of anti-friction roller bearings which, in turn, are supported and located by a like plurality of stub shafts 82. The plurality of stub shafts 82 are mounted within and secured to a planet carrier 84. The planet carrier 84 includes a plurality of internal splines or gear teeth 86. The planetary gear assembly 70 is more fully described in co-owned U.S. Pat. No. 4,440,042 which is herein incorporated by reference.

Adjacent and cooperating with the planetary gear assembly 70 is a dog clutch 90 having elongate internal splines or gear teeth which are slidably received upon a complementary plurality of external splines or gear teeth 92 on the output shaft 60. The clutch collar 90 thus rotates with the output shaft 60 but may translate bi-directionally therealong. The clutch collar 90 also includes a set of external splines or gear teeth 94 on one end which are in all respects complementary to the internal splines or gear teeth 86 on the planet carrier 84. The end of the clutch collar 90 opposite the splines or gear teeth 94 defines a circumferentially and radially extending flange 96.

The clutch collar 90 is capable of three positions and operational modes. In FIG. 2, the clutch collar 90 is illustrated in its center or neutral position wherein both the input shaft 52 and the planet carrier 84 are disconnected from the output shaft 60 and no power is transmitted therebetween. When translated to the left, direct drive is achieved when the internal splines or gear teeth of the clutch collar 90 engage the external splines or gear teeth 74 on the input shaft 52 thereby directly coupling the input shaft 52 to the output shaft 60 and providing direct or high gear drive therebetween.

When the clutch collar 90 is moved to the right from the position illustrated in FIG. 2, the speed reduction achieved by the planetary gear assembly 70 is engaged through engagement of the external splines or gear teeth 94 on the clutch collar 100 with the internal splines or gear teeth 86 on the planet carrier 84. So engaged, the planetary gear assembly 70 is active and provides a speed reduction, typically in the range of from 3:1 to 4:1 between the input shaft 52 and the output shaft 60.

The position of the clutch collar 90 is commanded by an electric shift control assembly 100. The shift control assembly 100 includes an electric drive motor 102 which receives control signals or instructions originating with the switches or push buttons 48. The drive motor 102 has an output shaft 104 coupled, preferably through an energy storing spring, to a cam 106 which axially positions a cam follower 108. The cam follower 108 translates a shift fork 110 slidably disposed upon a shift rail 112 which engages the flange 96 of the dog clutch 90.

The transfer case assembly 16 also includes an electromagnetically actuated disc pack type clutch assembly 120. The clutch assembly 120 is disposed about the output shaft 60 and includes a circular drive member 122 coupled to the output shaft 60 through, for example, a splined interconnection. The circular drive member 122 includes a plurality of circumferentially spaced-apart recesses 124 in the shape of an oblique section of a helical torus. Each of the recesses 124 receives one of a like plurality of balls 126.

A circular driven member 128 is disposed adjacent the circular drive member 122 and includes a like plurality of opposed recesses 134 defining the same shape as the recesses 124. The oblique side walls of the recesses 124 and 134 function as ramps or cams and cooperate with the balls 126 to drive the circular members 122 and 128 apart in response to relative rotation therebetween. It will be appreciated that the recesses 124 and 134 and the balls 126 may be replaced with other analogous mechanical elements which cause axial displacement of the circular members 122 and 128 in response to relative rotation therebetween. For example, tapered rollers disposed in complementarily configured conical helices may be utilized.

The circular driven member 128 extends radially outwardly and is secured to a soft iron rotor 136. An armature 138 is disposed adjacent the rotor 136. The rotor 136 surrounds an electromagnetic coil 140 on three sides. Both the rotor 136 and the armature 138 include arcuate discontinuous slots 142 which enhance magnetic attraction therebetween.

Providing electrical energy to the electromagnetic coil 140 causes magnetic attraction of the armature 138 to the rotor 136 which results in frictional contact between the armature 138 and the rotor 136. When the output shaft 60 is turning at a different speed than the armature 138, this frictional contact results in a frictional torque being transferred from the output shaft 60, through the circular drive member 122, through the balls 126 and to the circular driven member 128. The resulting frictional torque causes the balls 126 to ride up the ramps of the recesses 124 and 134, causing axial displacement of the circular drive member 122.

Axial displacement of the circular drive member 122 translates an apply plate 148 axially toward a disc pack clutch assembly 150. A compression spring 152 which may comprise a stack of Belleville washers provides a restoring force which biases the circular drive member 122 toward the circular driven member 128 and returns the balls 126 to center positions in the circular recesses 124 and 134 to provide maximum clearance and minimum friction between the components of the electromagnetic clutch assembly 120 when it is deactivated.

The disc pack clutch assembly 150 includes a first plurality of smaller friction plates or discs 152. The first plurality of discs 152 are coupled by interengaging splines to a clutch hub 154 which is coupled by interengaging splines to the output shaft 60 for rotation therewith. A second plurality of larger friction plates or discs 156 are coupled to an annular housing 160 by interengaging spines for rotation therewith and are interleaved with the first plurality of friction discs 152. Preferably, one face or surface of each of the friction plates or discs 152 and 156 includes friction clutch material in accordance with conventional clutch practice.

The annular housing 160 is disposed concentrically about the output shaft 60 and is coupled to a chain drive sprocket 162 by a plurality of interengaging teeth, spines or lugs and recesses 164. The chain drive sprocket 162 is freely rotatably disposed on the output shaft 60 and is supported by a journal or needle bearing assembly 166. When the clutch assembly 120 is engaged, it transfers energy from the output shaft 60 to the chain drive sprocket 162. A drive chain 168 is received upon the chain drive sprocket 162 and engages and transfers rotational energy to a torque limiting chain sprocket assembly 170.

Figure 3:
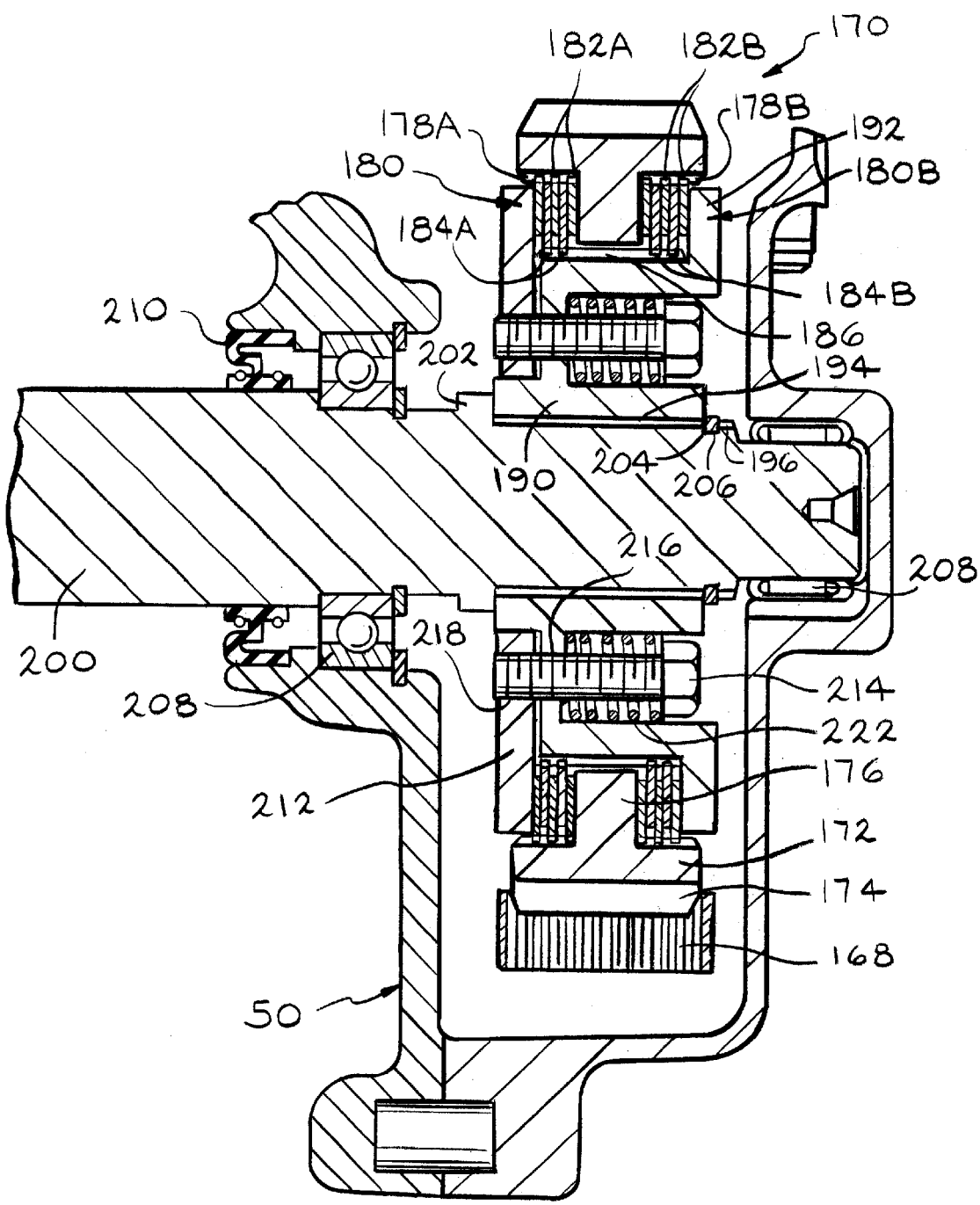
FIG. 3 is an enlarged, fragmentary, sectional view of a preferred embodiment of a chain sprocket assembly according to the present invention.
Figure 4:
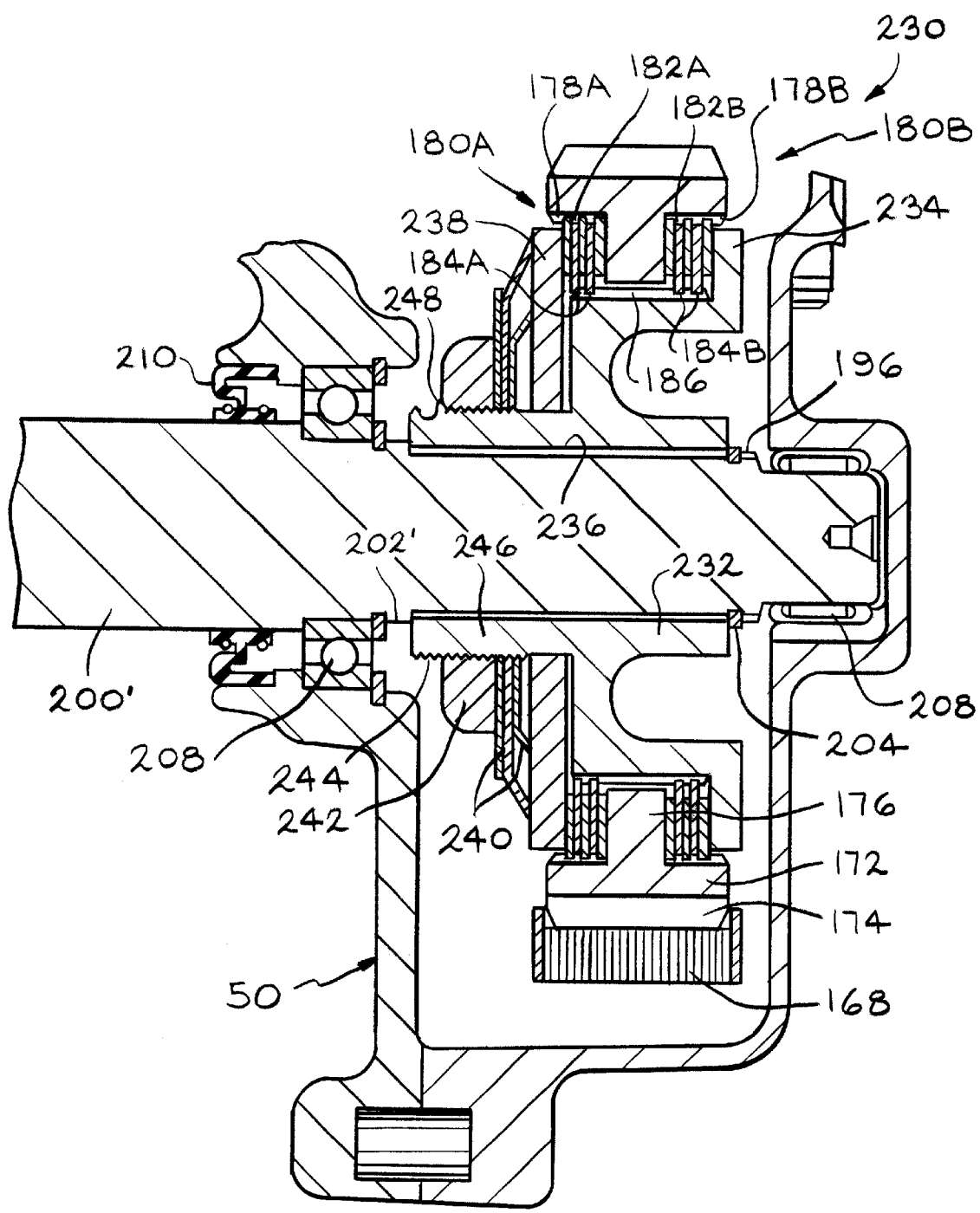
FIG. 4 is an enlarged, fragmentary, sectional view of a first alternate embodiment of a chain sprocket assembly according to the present invention

Referring now to FIGS. 2 and 3, the torque limiting chain sprocket assembly 170 includes a chain sprocket collar 172 having chain teeth 174 about its circumference which receive and engage the drive chain 168. The chain sprocket collar 172 also includes an inwardly extending annular flange 176. The annular flange 176 is axially centered on the chain sprocket collar 172. Extending axially away from the annular flange 176 on both inside faces of the chain sprocket collar 172 are left and right (first and second) sets of internal or female splines or gear teeth 178A and 178B. The sets of splines or gear teeth 178A and 178B are associated with left and right (first and second) friction clutch pack assemblies 180A and 180B disposed on opposite sides of the annular flange 176. Each of the clutch packs 180A and 180B includes a set of larger diameter friction clutch plates or discs 182A and 182B which engage the respective sets of female splines or gear teeth 178A and 178B and therefore rotate therewith. Sets of smaller friction clutch plates or discs 184A and 184B are interleaved with the friction clutch plates or discs 182A and 182B, respectively, and engage a plurality of external or male spines or gear teeth 186 disposed on a circular clutch member 190. In accordance with conventional practice, one face or surface of each of the friction plates or discs 182A, 182B, 184A and 184B includes friction clutch material. The circular clutch member 190 includes an outwardly extending radial flange 192 which engages and restrains the right friction clutch pack 180B. The clutch member 190 also defines a plurality of internal or female splines or gear teeth 194 which engage complementarily configured external or male splines or gear teeth 196 on a secondary output shaft 200. The circular clutch member 190 is maintained axially in position on the secondary output shaft 200 by a shoulder 202 and a snap ring 204 which seats within a suitable channel 206 in the secondary output shaft 200. The secondary output shaft 200 is rotatably supported in the housing assembly 50 on a pair of anti-friction bearings 208 which may be either roller bearing assemblies or ball bearing assemblies as illustrated. An oil seal 210 provides a fluid tight seal between the secondary output shaft 200 and the housing assembly 50.

On the left side of the chain sprocket assembly 170 engaging the left friction clutch pack 180A is a circular plate 212. The circular plate 212 is secured to the circular clutch member 190 by a plurality of threaded fasteners 214, two of which are illustrated in FIG. 3, which extend through suitable openings 216 in the clutch member 190 and into threaded openings 218 in the circular plate 212. Compression springs 222 reside about the threaded fasteners 216 and provides a biasing force to the right as illustrated in FIG. 3 which compresses the friction clutch packs 180A and 180B against the radial flange 192 of the clutch member 190. Preferably, six of the threaded fasteners 214 and associated components are utilized in an equally spaced (60° intervals) array about the axis of the secondary output shaft 200 although more or fewer of the threaded fasteners 214 and associated components may be utilized if desired.

It will be appreciated that rotation of the threaded fasteners 214 to increase or reduce the compressive force applied to the two friction clutch packs 180A and 180B will increase or decrease the frictional coupling between the chain sprocket collar 172 and the secondary output shaft 200 thereby increasing or decreasing the maximum torque which may be transmitted through the sprocket assembly 170 before the clutch assemblies 180A and 180B slip.

Turning now to FIG. 47 a first alternate embodiment torque limiting chain sprocket assembly 230 is illustrated. The first alternate embodiment torque limiting chain sprocket assembly 230 is similar in many respects to the preferred embodiment chain sprocket assembly 170 and includes the chain sprocket collar 172 having the chain teeth 174, the axially centered annular flange 176 and left and right (first and second) internal or female splines or gear teeth 178A and 178B. The first alternate embodiment chain sprocket assembly 230 also includes left and right (first and second) friction clutch pack assemblies 180A and 180B which include larger diameter splined friction plates or discs 182A and 182B which engage the splines 178A and 178B, respectively, as well as smaller diameter friction clutch plates or discs 184A and 184B which engage the external or male splines or gear teeth 186 on a circular clutch member 232.

The circular clutch member 232 includes a radially and circumferentially extending flange 234 and defines internal or female splines or gear teeth 236 which are received upon external or male splines or gear teeth 196 on a secondary output shaft 200'. The circular clutch member 232 is axially positioned and restrained upon the secondary output shaft 200' by a shoulder 202' and a snap ring 204 received within a circular channel 206. The secondary output shaft 200' is supported by anti-friction bearings 208 and is sealed by an oil seal 210. Adjacent the left (first) friction clutch pack assembly 180A is a circular pressure plate 238, which with the radial flange 234, traps and applies pressure to the left and right friction clutch packs 180A and 180B. Adjacent the circular pressure plate 238 is a stack of two or more Belleville washers 240 which are maintained in position by a threaded lock nut 242. The threaded lock nut 242 is received upon male threads 244 residing on a cylindrical extension 246 of the circular clutch member 232. Adjustment of the maximum torque throughput of the first alternate embodiment chain sprocket assembly 230 is achieved by rotating the lock nut 242 relative to the circular clutch member 234 to a adjust the compressive force applied to the friction clutch packs 180A and 180B. When a desired maximum level of torque throughput is achieved, the lock nut 242 may be staked at a location 248 or secured in some other fashion, such as a second nut or an adhesive, to the cylindrical extension 246 to maintain its position and torque setting.

It should be appreciated that although the preferred and alternate embodiment chain sprocket assemblies 170 and 230 have been described as located upon the secondary output shafts 200 and 200', respectively, at the drive end of the chain 168, the chain sprocket assemblies 170 and 230 may also be located upon the primary output shaft 60, at the drive end of the chain 168. So disposed, the circular members 190 and 232 will be driven by the housing (output member) 160 of the clutch assembly 120 and the chain 168 will drive the secondary output shafts 200 and 200' through a chain sprocket directly coupled thereto.

In operation, the main clutch of the transfer case assembly which may be either a two position (on-off), typically, mechanical clutch, an overrunning clutch, a viscous clutch or a hydraulically or electromagnetically actuated modulatable disc pack clutch such as the assembly 120 illustrated, is engaged to provide drive torque to the secondary drive line 30. Such drive torque is provided through the first or drive chain sprocket 162 to the second or driven sprocket collar 172 of the torque limiting chain sprocket assembly 170. Should the tire and wheel assemblies 38 of the secondary or front drive line 30 encounter a traction condition vastly different from the conditions encountered by the tire and wheel assemblies 28 of the rear or primary drive line assembly 20 or any other driving condition anomaly exist such that torque in excess of a desired limit could be delivered to the front or secondary tire and wheel assemblies 38 through the secondary drive line 30, the friction clutch pack assemblies 180A and 180B transfer torque up to their maximum calibrated and selected limit and then permit the secondary output shaft 200 to rotate at a different speed than the chain sprocket collar 172, i.e., slip, while transferring torque therethrough at the desired and pre-selected level.

It will be appreciated that the first alternate embodiment torque limiting chain sprocket assembly 230 functions essentially in the same manner.

It will also be appreciated that the torque limiting chain sprocket assemblies 170 and 230 provide unique operational features and benefits not achieved by prior transfer cases and clutches such as the modulating clutch assembly 120 illustrated and described or the on-off, overrunning or viscous clutches referenced. For example, a modulating clutch is typically activated and modulated as a function of front to rear speed differences resulting from wheel spin or slip. The chain sprocket assemblies 170 and 230, however, control or limit only maximum torque passing therethrough and delivered to the secondary axles 36 and tire and wheel assemblies 38.

The foregoing disclosure is the best mode devised by the inventor for practicing this invention. It is apparent, however, that devices incorporating modifications and variations will be obvious to one skilled in the art of motor vehicle drive systems. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What is claimed is:

1. A torque limiting assembly for a motor vehicle transfer case having a primary output member and a secondary output member, comprising, in combination,
    a pair of spaced apart chain sprockets,
    a respective one of said chain sprockets associated with said primary output member and said secondary output member,
    a chain engaging said pair of chain sprockets, and
    a clutch assembly associated with one of said chain sprockets and having a first plurality of friction clutch plates coupled for rotation with said one of said chain sprockets, a second plurality of friction clutch plates interleaved with said first plurality of friction clutch plates, at least one Belleville spring for providing compressive force to said pluralities of clutch plates and an adjustment nut for adjusting said compressive force.

2. The torque limiting assembly of claim 1 wherein said second plurality of friction clutch plates is coupled for rotation with one of said primary output member and said secondary output member.

3. The torque limiting assembly of claim 1 wherein said friction clutch plates include friction material.

4. The torque limiting assembly of claim 1 wherein said one of said chain sprockets includes a plurality of internal splines and a central flange.

5. The torque limiting assembly of claim 1 further including a pair of plates operably associated with said at least one spring for engaging said pluralities of friction clutch plates.

6. A torque limiting chain sprocket assembly for a transfer case comprising, in combination,
    a primary output member,
    a first chain sprocket,
    a first clutch operably disposed between said primary output member and said first chain sprocket,
    a second chain sprocket,
    a chain engaging said first chain sprocket and said second chain sprocket,
    a secondary output member, and
    a torque limiting clutch assembly operably disposed between said second chain sprocket and said secondary output member, said torque limiting clutch assembly including a first plurality of friction clutch plates coupled for rotation with said second chain sprocket, a second plurality of friction clutch plates interleaved with said first plurality of friction clutch plates and coupled for rotation with said secondary output member and at least one spring for compressing said pluralities of friction clutch plates.

7. The torque limiting chain sprocket assembly of claim 6 wherein said at least one spring is a plurality of compression springs disposed upon threaded bolts.

8. The torque limiting chain sprocket assembly of claim 6 further including a pair of plates operably associated with said at least one spring for engaging said pluralities of friction clutch plates.

9. The torque limiting chain sprocket assembly of claim 6 wherein said second chain sprocket includes a plurality of internal splines and a central flange.

10. The torque limiting chain sprocket assembly of claim 6 wherein said at least one spring is a Belleville spring and further including an adjustment nut.

11. The torque limiting chain sprocket assembly of claim 6 wherein said friction clutch plates include friction material.

12. A transfer case having a torque limiting clutch comprising, in combination,
- a primary output member adapted to drive a primary driveline,
- a first chain sprocket,
- a clutch having an input coupled to said primary output member and an output,
- a second chain sprocket,
- a chain engaging said first chain sprocket and said second chain sprocket,
- a secondary output member adapted to drive a secondary drive line, and
- a torque limiting clutch operably disposed between said second chain sprocket and said secondary output member, said torque limiting clutch including a first plurality of clutch plates coupled for rotation with said second chain sprocket, a second plurality of clutch plates interleaved with said first plurality of clutch plates and coupled for rotation with said secondary output member and at least one spring for providing compressive force to said pluralities of clutch plates.

13. The transfer case of claim 12 wherein said clutch plates include friction material.

14. The transfer case of claim 12 wherein said spring is a plurality of compression springs.

15. The transfer case of claim 12 wherein said spring is a Belleville spring and further including an adjustable nut.

16. The transfer case of claim 12 wherein said second chain sprocket includes a plurality of internal splines and a central flange.

17. The transfer case of claim 12 further including a clutch hub having a plurality of external splines.

18. The transfer case of claim 12 further included a pair of plates operably associated with said at least one spring engaging said plurality of friction clutch plates.

19. A torque limiting assembly for a motor vehicle transfer case having a primary output member and a secondary output member, comprising, in combination,
- a pair of spaced apart chain sprockets,
- a respective one of said chain sprockets associated with said primary output member and said secondary output member,
- a chain engaging said pair of chain sprockets, and
- a clutch assembly associated with one of said chain sprockets and having a first plurality of friction clutch plates coupled for rotation with said one of said chain sprockets, a second plurality of friction clutch plates interleaved with said first plurality of friction clutch plates and a plurality of compression springs disposed upon threaded bolts for providing compressive force to said pluralities of clutch plates.

20. The torque limiting assembly of claim 19 wherein said second plurality of friction clutch plates is coupled for rotation with one of said primary output member and said second output member.

* * * * *